US010817657B2

(12) United States Patent
Akyamac et al.

(10) Patent No.: US 10,817,657 B2
(45) Date of Patent: Oct. 27, 2020

(54) DETERMINATION OF FIELD TYPES IN TABULAR DATA

(71) Applicant: Nokia Solutions and Networks Oy, Espoo (FI)

(72) Inventors: Ahmet Akyamac, Bridgewater, NJ (US); Rajarshi Bhowmik, Newark, NJ (US); Jeongran Lee, Basking Ridge, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 125 days.

(21) Appl. No.: 16/232,279

(22) Filed: Dec. 26, 2018

(65) Prior Publication Data

US 2020/0210520 A1 Jul. 2, 2020

(51) Int. Cl.
*G06F 40/177* (2020.01)
*G06F 40/174* (2020.01)
*G06N 5/04* (2006.01)
*G06F 16/35* (2019.01)

(52) U.S. Cl.
CPC .......... *G06F 40/177* (2020.01); *G06F 16/35* (2019.01); *G06F 40/174* (2020.01); *G06N 5/046* (2013.01)

(58) Field of Classification Search
CPC .................................................. G06F 40/177
See application file for complete search history.

(56) References Cited

U.S. PATENT DOCUMENTS 7,092,941 B1 * 8/2006 Campos ................. G06F 17/30
2015/0242431 A1 * 8/2015 Vlcek ............... G06F 17/30144

OTHER PUBLICATIONS

Rahm, E. and Bernstein, P. A., "A survey of approaches to automatic schema matching," The VLDB Journal 10, DOI=http://dx.doi.org/10.1007/s007780100057, Dec. 2001, pp. 334-350.
Berlin, J. and Motro, A., "Database Schema Matching Using Machine Learning with Feature Selection," In: Bubenko, J., Krogstie, J., Pastor, O., Pernici, B., Rolland, C., Sølvberg, A. (eds.) Seminal Contributions to Information Systems Engineering. Springer, Berlin, Heidelberg (2013). (Originally: In Proceedings of the 14th International Conference on Advanced Information Systems Engineering, CAISE 2002, LNCS 2348, pp. 452-466, 2002.) DOI= https://doi.org/10.1007/978-3-642-36926-1_25.

(Continued)

*Primary Examiner* — James J Debrow
(74) *Attorney, Agent, or Firm* — Tong, Rea, Bentley & Kim LLC

(57) ABSTRACT

Various example embodiments for supporting determination of field types in tabular data are presented. Various example embodiments for supporting determination of field types in tabular data are configured to provide improvements in computer performance for supporting determination of field types in tabular data. Various example embodiments for supporting determination of field types in tabular data are configured to generate an embedding knowledge base based on training tabular data and to process new tabular data based on the embedding knowledge base in order to determine field types of fields included in the new tabular data.

20 Claims, 6 Drawing Sheets

(56) References Cited

OTHER PUBLICATIONS

Mikolov, T., Sutskever, I., Chen, K., Corrado, G. and Dean, J., "Distributed Representations of Words and Phrases and their Compositionality," In Proceedings of the 26th Advances in Neural Information Processing Systems (NIPS 2013), arXiv:1310.4546, Dec. 5, 2013, pp. 3111-3119.

Rudolph, M. R., Ruiz, F. J. R., Mandt, S., and Blei, D. M., "Exponential Family Embeddings," In Proceedings of $30^{th}$ Conference on Neural Information Processing Systems (NIPS 2016), Dec. 5, 2016, pp. 478-486.

Armona, L., et al., "FEAT2VEC: Dense Vector Representation of Data With Arbitrary Features," submitted to ICLR 2018 Conference, printed from https://openreview.net/forum?id=rkZzY-ICb, printed on Oct. 9, 2019, 18 pages.

\* cited by examiner

DETERMINATION OF FIELD TYPES IN TABULAR DATA

TECHNICAL FIELD

Various example embodiments relate generally to understanding tabular data and, more particularly but not exclusively, to understanding tabular data associated with systems such as telecommunications systems.

BACKGROUND

Tabular data is used in various types of systems in various contexts, such as in trouble ticket systems in telecommunications environments. Tabular data is useful for various purposes in such systems and contexts; however, certain types of tabular data may be prone to contain inconsistencies that make use of such tabular data challenging.

SUMMARY

In at least some example embodiments, an apparatus includes at least one processor and at least one memory including computer program code, wherein the at least one memory and the computer program code are configured to, with the at least one processor, cause the apparatus to at least generate, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field and determine, for a second set of tabular data including a field having an undetermined field type and based on the embedding knowledge base, a determined field type for the field having the undetermined field type. In at least some example embodiments, the at least one memory and the computer program code are configured to, with the at least one processor, cause the apparatus to at least determine, based on the first set of tabular data, the field entry vectors representing ones of the field entries of the respective field. In at least some example embodiments, for at least one of the field entries of the respective field, the respective field entry vector is determined based on log-likelihood processing of a set of field analysis vectors associated with the respective field entry. In at least some example embodiments, the set of field analysis vectors associated with the respective field entry includes a field entry vector for the field entry, a set of field entry vectors for a set of field entries of the tabular data providing positive context for the respective field entry, and a set of field entry vectors for a set of field entries of the tabular data providing negative context for the respective field entry. In at least some example embodiments, the set of field entries of the tabular data providing the positive context for the respective field entry includes one or more other field entries of the respective field and the set of field entries of the tabular data providing the negative context for the respective field entry includes one or more other field entries from one or more other fields of the first set of tabular data. In at least some example embodiments, the log-likelihood processing is configured for at least one of maximizing a likelihood of positive context for the respective field entry or minimizing a likelihood of negative context for the field entry. In at least some example embodiments, to determine the respective field entry vector for the respective field entry based on log-likelihood processing of the set of field analysis vectors associated with the respective field entry, the at least one memory and the computer program code are configured to, with the at least one processor, cause the apparatus to at least determine, based on the first set of tabular data, one or more positive context field entries for the respective field entry and one or more negative context field entries for the respective field entry, process, based on a set of convolutional neural network encoders, the respective field entry, the one or more positive context field entries for the respective field entry, and the one or more negative context field entries, to produce a set of field analysis vectors for the respective field entry, and determine, based on log-likelihood processing of the set of field analysis vectors associated with the respective field entry in a manner tending to maximize positive context and minimize negative context, the respective field entry vector for the respective field entry. In at least some example embodiments, for at least one of the field analysis vectors associated with the respective field entry, the field analysis vector is determined based on representation learning based on context. In at least some example embodiments, for at least one of the field analysis vectors associated with the respective field entry, the field analysis vector is determined based on application of a mapping configured to map input character embeddings of the respective field entry to a dense embedding representative of the respective field entry. In at least some example embodiments, the mapping is based on at least one of a convolutional filter, concatenation, max-pooling, or a linear layer mapping. In at least some example embodiments, the mapping is applied by a convolutional neural network encoder. In at least some example embodiments, for at least one of the field analysis vectors associated with the respective field entry, the field analysis vector is determined based on character embeddings. In at least some example embodiments, to determine the field analysis vector for the respective field entry based on character embeddings, the at least one memory and the computer program code are configured to, with the at least one processor, cause the apparatus to at least provide character embeddings based on a set of characters included in the respective field entry, apply the character embeddings to a set of convolutional filters with non-linear activation to form a concatenated vector, and map, based on a linear map, the concatenated vector to provide the field analysis vector in the form of a dense embedding of the respective field entry. In at least some example embodiments, the least one memory and the computer program code are configured to, with the at least one processor, cause the apparatus to at least determine, based on the field entry vectors representing ones of the field entries of the respective field, the respective representative vector representing the respective field type of the respective field. In at least some example embodiments, the representative vector representing the respective field type of the respective field is determined based on an element-wise mean of field entry vectors representing ones of the field entries of the respective field. In at least some example embodiments, to determine the determined field type for the field having the undetermined field type, the at least one memory and the computer program code are configured to, with the at least one processor, cause the apparatus to at least determine, based on one or more field entries from the field having the undetermined field type, one or more field entry vectors for the field having the undetermined field type and determine, based on comparisons of the one or more field entry vectors for the field having the undetermined field type to at least a portion of the context clusters of the embedding knowledge base, the determined field type for the field having the undetermined field type. In at least some example embodiments, the comparisons of the one or more field entry vectors for the field having the undetermined field type to at least a portion of the context clusters of the embedding knowledge base are based on use of cosine similarities. In at least some example embodiments, based on a determination that multiple potential field types are identified based on the comparisons of the one or more field entry vectors for the field having the undetermined field type to at least a portion of the context clusters of the embedding knowledge base, the determined field type for the field having the undetermined field type is determined based on majority voting.

In at least some example embodiments, a non-transitory computer-readable medium includes instructions configured to cause an apparatus to at least generate, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field and determine, for a second set of tabular data including a field having an undetermined field type and based on the embedding knowledge base, a determined field type for the field having the undetermined field type. In at least some example embodiments, the instructions are configured to cause the apparatus to at least determine, based on the first set of tabular data, the field entry vectors representing ones of the field entries of the respective field. In at least some example embodiments, for at least one of the field entries of the respective field, the respective field entry vector is determined based on log-likelihood processing of a set of field analysis vectors associated with the respective field entry. In at least some example embodiments, the set of field analysis vectors associated with the respective field entry includes a field entry vector for the field entry, a set of field entry vectors for a set of field entries of the tabular data providing positive context for the respective field entry, and a set of field entry vectors for a set of field entries of the tabular data providing negative context for the respective field entry. In at least some example embodiments, the set of field entries of the tabular data providing the positive context for the respective field entry includes one or more other field entries of the respective field and the set of field entries of the tabular data providing the negative context for the respective field entry includes one or more other field entries from one or more other fields of the first set of tabular data. In at least some example embodiments, the log-likelihood processing is configured for at least one of maximizing a likelihood of positive context for the respective field entry or minimizing a likelihood of negative context for the field entry. In at least some example embodiments, to determine the respective field entry vector for the respective field entry based on log-likelihood processing of the set of field analysis vectors associated with the respective field entry, the instructions are configured to cause the apparatus to at least determine, based on the first set of tabular data, one or more positive context field entries for the respective field entry and one or more negative context field entries for the respective field entry, process, based on a set of convolutional neural network encoders, the respective field entry, the one or more positive context field entries for the respective field entry, and the one or more negative context field entries, to produce a set of field analysis vectors for the respective field entry, and determine, based on log-likelihood processing of the set of field analysis vectors associated with the respective field entry in a manner tending to maximize positive context and minimize negative context, the respective field entry vector for the respective field entry. In at least some example embodiments, for at least one of the field analysis vectors associated with the respective field entry, the field analysis vector is determined based on representation learning based on context. In at least some example embodiments, for at least one of the field analysis vectors associated with the respective field entry, the field analysis vector is determined based on application of a mapping configured to map input character embeddings of the respective field entry to a dense embedding representative of the respective field entry. In at least some example embodiments, the mapping is based on at least one of a convolutional filter, concatenation, max-pooling, or a linear layer mapping. In at least some example embodiments, the mapping is applied by a convolutional neural network encoder. In at least some example embodiments, for at least one of the field analysis vectors associated with the respective field entry, the field analysis vector is determined based on character embeddings. In at least some example embodiments, to determine the field analysis vector for the respective field entry based on character embeddings, the instructions are configured to cause the apparatus to at least provide character embeddings based on a set of characters included in the respective field entry, apply the character embeddings to a set of convolutional filters with non-linear activation to form a concatenated vector, and map, based on a linear map, the concatenated vector to provide the field analysis vector in the form of a dense embedding of the respective field entry. In at least some example embodiments, the instructions are configured to cause the apparatus to at least determine, based on the field entry vectors representing ones of the field entries of the respective field, the respective representative vector representing the respective field type of the respective field. In at least some example embodiments, the representative vector representing the respective field type of the respective field is determined based on an element-wise mean of field entry vectors representing ones of the field entries of the respective field. In at least some example embodiments, to determine the determined field type for the field having the undetermined field type, the instructions are configured to cause the apparatus to at least determine, based on one or more field entries from the field having the undetermined field type, one or more field entry vectors for the field having the undetermined field type and determine, based on comparisons of the one or more field entry vectors for the field having the undetermined field type to at least a portion of the context clusters of the embedding knowledge base, the determined field type for the field having the undetermined field type. In at least some example embodiments, the comparisons of the one or more field entry vectors for the field having the undetermined field type to at least a portion of the context clusters of the embedding knowledge base are based on use of cosine similarities. In at least some example embodiments, based on a determination that multiple potential field types are identified based on the comparisons of the one or more field entry vectors for the field having the undetermined field type to at least a portion of the context clusters of the embedding knowledge base, the determined field type for the field having the undetermined field type is determined based on majority voting.

In at least some example embodiments, a method includes generating, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field and determining, for a second set of tabular data including a field having an undetermined field type and based on the embedding knowledge base, a determined field type for the field having the undetermined field type. In at least some example embodiments, the method includes determining, based on the first set of tabular data, the field entry vectors representing ones of the field entries of the respective field. In at least some example embodiments, for at least one of the field entries of the respective field, the respective field entry vector is determined based on log-likelihood processing of a set of field analysis vectors associated with the respective field entry. In at least some example embodiments, the set of field analysis vectors associated with the respective field entry includes a field entry vector for the field entry, a set of field entry vectors for a set of field entries of the tabular data providing positive context for the respective field entry, and a set of field entry vectors for a set of field entries of the tabular data providing negative context for the respective field entry. In at least some example embodiments, the set of field entries of the tabular data providing the positive context for the respective field entry includes one or more other field entries of the respective field and the set of field entries of the tabular data providing the negative context for the respective field entry includes one or more other field entries from one or more other fields of the first set of tabular data. In at least some example embodiments, the log-likelihood processing is configured for at least one of maximizing a likelihood of positive context for the respective field entry or minimizing a likelihood of negative context for the field entry. In at least some example embodiments, determining the respective field entry vector for the respective field entry based on log-likelihood processing of the set of field analysis vectors associated with the respective field entry includes determining, based on the first set of tabular data, one or more positive context field entries for the respective field entry and one or more negative context field entries for the respective field entry, processing, based on a set of convolutional neural network encoders, the respective field entry, the one or more positive context field entries for the respective field entry, and the one or more negative context field entries, to produce a set of field analysis vectors for the respective field entry, and determining, based on log-likelihood processing of the set of field analysis vectors associated with the respective field entry in a manner tending to maximize positive context and minimize negative context, the respective field entry vector for the respective field entry. In at least some example embodiments, for at least one of the field analysis vectors associated with the respective field entry, the field analysis vector is determined based on representation learning based on context. In at least some example embodiments, for at least one of the field analysis vectors associated with the respective field entry, the field analysis vector is determined based on application of a mapping configured to map input character embeddings of the respective field entry to a dense embedding representative of the respective field entry. In at least some example embodiments, the mapping is based on at least one of a convolutional filter, concatenation, max-pooling, or a linear layer mapping. In at least some example embodiments, the mapping is applied by a convolutional neural network encoder. In at least some example embodiments, for at least one of the field analysis vectors associated with the respective field entry, the field analysis vector is determined based on character embeddings. In at least some example embodiments, determining the field analysis vector for the respective field entry based on character embeddings includes providing character embeddings based on a set of characters included in the respective field entry, applying the character embeddings to a set of convolutional filters with non-linear activation to form a concatenated vector, and mapping, based on a linear map, the concatenated vector to provide the field analysis vector in the form of a dense embedding of the respective field entry. In at least some example embodiments, the method includes determining, based on the field entry vectors representing ones of the field entries of the respective field, the respective representative vector representing the respective field type of the respective field. In at least some example embodiments, the representative vector representing the respective field type of the respective field is determined based on an element-wise mean of field entry vectors representing ones of the field entries of the respective field. In at least some example embodiments, determining the determined field type for the field having the undetermined field type includes determining, based on one or more field entries from the field having the undetermined field type, one or more field entry vectors for the field having the undetermined field type and determining, based on comparisons of the one or more field entry vectors for the field having the undetermined field type to at least a portion of the context clusters of the embedding knowledge base, the determined field type for the field having the undetermined field type. In at least some example embodiments, the comparisons of the one or more field entry vectors for the field having the undetermined field type to at least a portion of the context clusters of the embedding knowledge base are based on use of cosine similarities. In at least some example embodiments, based on a determination that multiple potential field types are identified based on the comparisons of the one or more field entry vectors for the field having the undetermined field type to at least a portion of the context clusters of the embedding knowledge base, the determined field type for the field having the undetermined field type is determined based on majority voting.

In at least some example embodiments, an apparatus includes means for generating, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field and means for determining, for a second set of tabular data including a field having an undetermined field type and based on the embedding knowledge base, a determined field type for the field having the undetermined field type. In at least some example embodiments, the apparatus includes means for determining, based on the first set of tabular data, the field entry vectors representing ones of the field entries of the respective field. In at least some example embodiments, for at least one of the field entries of the respective field, the respective field entry vector is determined based on log-likelihood processing of a set of field analysis vectors associated with the respective field entry. In at least some example embodiments, the set of field analysis vectors associated with the respective field entry includes a field entry vector for the field entry, a set of field entry vectors for a set of field entries of the tabular data providing positive context for the respective field entry, and a set of field entry vectors for a set of field entries of the tabular data providing negative context for the respective field entry. In at least some example embodiments, the set of field entries of the tabular data providing the positive context for the respective field entry includes one or more other field entries of the respective field and the set of field entries of the tabular data providing the negative context for the respective field entry includes one or more other field entries from one or more other fields of the first set of tabular data. In at least some example embodiments, the log-likelihood processing is configured for at least one of maximizing a likelihood of positive context for the respective field entry or minimizing a likelihood of negative context for the field entry. In at least some example embodiments, the means for determining the respective field entry vector for the respective field entry based on log-likelihood processing of the set of field analysis vectors associated with the respective field entry includes means for determining, based on the first set of tabular data, one or more positive context field entries for the respective field entry and one or more negative context field entries for the respective field entry, means for processing, based on a set of convolutional neural network encoders, the respective field entry, the one or more positive context field entries for the respective field entry, and the one or more negative context field entries, to produce a set of field analysis vectors for the respective field entry, and means for determining, based on log-likelihood processing of the set of field analysis vectors associated with the respective field entry in a manner tending to maximize positive context and minimize negative context, the respective field entry vector for the respective field entry. In at least some example embodiments, for at least one of the field analysis vectors associated with the respective field entry, the field analysis vector is determined based on representation learning based on context. In at least some example embodiments, for at least one of the field analysis vectors associated with the respective field entry, the field analysis vector is determined based on application of a mapping configured to map input character embeddings of the respective field entry to a dense embedding representative of the respective field entry. In at least some example embodiments, the mapping is based on at least one of a convolutional filter, concatenation, max-pooling, or a linear layer mapping. In at least some example embodiments, the mapping is applied by a convolutional neural network encoder. In at least some example embodiments, for at least one of the field analysis vectors associated with the respective field entry, the field analysis vector is determined based on character embeddings. In at least some example embodiments, the means for determining the field analysis vector for the respective field entry based on character embeddings includes means for providing character embeddings based on a set of characters included in the respective field entry, applying the character embeddings to a set of convolutional filters with non-linear activation to form a concatenated vector, and means for mapping, based on a linear map, the concatenated vector to provide the field analysis vector in the form of a dense embedding of the respective field entry. In at least some example embodiments, the apparatus includes means for determining, based on the field entry vectors representing ones of the field entries of the respective field, the respective representative vector representing the respective field type of the respective field. In at least some example embodiments, the representative vector representing the respective field type of the respective field is determined based on an element-wise mean of field entry vectors representing ones of the field entries of the respective field. In at least some example embodiments, the means for determining the determined field type for the field having the undetermined field type includes means for determining, based on one or more field entries from the field having the undetermined field type, one or more field entry vectors for the field having the undetermined field type and means for determining, based on comparisons of the one or more field entry vectors for the field having the undetermined field type to at least a portion of the context clusters of the embedding knowledge base, the determined field type for the field having the undetermined field type. In at least some example embodiments, the comparisons of the one or more field entry vectors for the field having the undetermined field type to at least a portion of the context clusters of the embedding knowledge base are based on use of cosine similarities. In at least some example embodiments, based on a determination that multiple potential field types are identified based on the comparisons of the one or more field entry vectors for the field having the undetermined field type to at least a portion of the context clusters of the embedding knowledge base, the determined field type for the field having the undetermined field type is determined based on majority voting.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
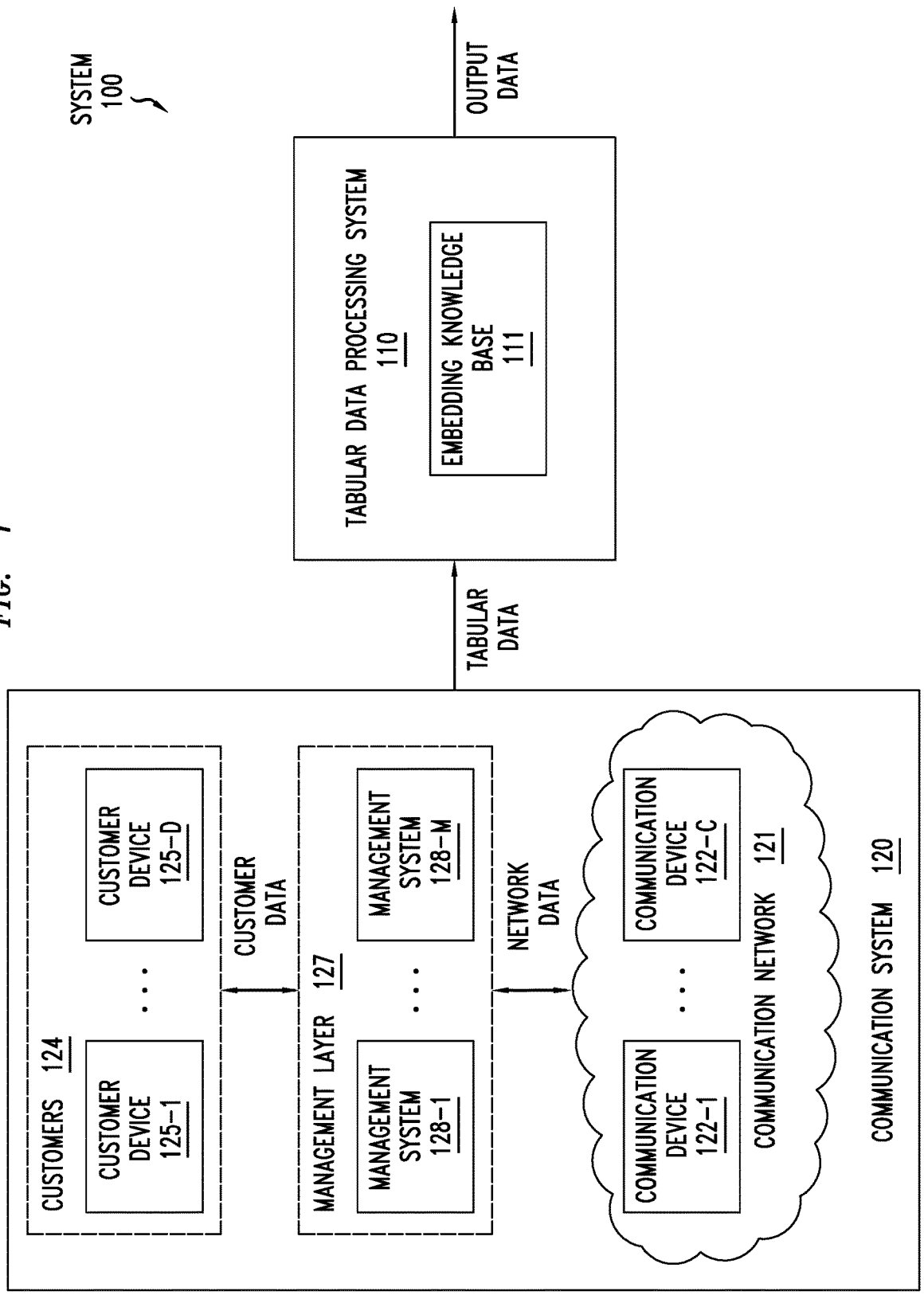
FIG. 1 depicts an example embodiment of system including a tabular data processing system configured to support processing of tabular data within a trouble ticket context of a telecommunications network.

Various example embodiments for supporting determination of field types in tabular data are presented. Various example embodiments for supporting determination of field types in tabular data are configured to provide improvements in computer performance for supporting determination of field types in tabular data. Various example embodiments for supporting determination of field types in tabular data are configured to generate an embedding knowledge base based on training tabular data and to process new tabular data based on the embedding knowledge base in order to determine field types of fields included in the new tabular data. The training tabular data may include any tabular data which may be used to generate the embedding knowledge base (e.g., tabular data having known field type information) while the new tabular data may include any tabular data which may be analyzed based on the embedding knowledge base (e.g., tabular data having unknown field type information, which may include previously unseen tabular data). The embedding knowledge base may be generated to provide reference information which may be used in order to process new tabular data in order to determine field types of fields included in the new tabular data. The embedding knowledge base may include representative data that is representative of field types of tabular data and, accordingly, which may be used to determine field types of fields included in the new tabular data. (e.g., context clusters associated with field types and including representative vectors representative of the field types, respectively, which may be determined based on dense vector representations of field entries known to be of the field types, respectively). The representative data of the embedding knowledge base may include, for each of one or more field types of the training tabular data, a respective context cluster for the respective field type that includes a set of field entry vectors for at least a portion of the field entries of the field type and a representative vector for the field type that is determined based on the field entry vectors for field entries of the field type and that is representative of the field type (e.g., where the representative vector for the field type may be considered to be the centroid of the context cluster for the respective field type). The representative data of the embedding knowledge base may be generated based on use of representation learning using context (e.g., based on use of positive and negative context), character embeddings (e.g., based on use of convolutional filters to provide a dense embedding), log-likelihood processing (e.g., based on mechanisms for minimizing or tending to minimize negative context and maximizing or tending to maximize positive context), pair-wise vector processing (e.g., for combining multiple field entry vectors for multiple field entries of a field type to produce, for the field type, the representative vector that may operate as a centroid of the context cluster for the field type), and so forth. The processing of new tabular data based on the embedding knowledge base may be performed to determine field types of fields included in the new tabular data, as many types of new tabular data associated with various environments and associated systems may not include field type information which might be needed to understand and use the new tabular data. The processing of new tabular data based on the embedding knowledge base may include, for a given field of the new tabular data, generation of field entry vectors for respective field entries of the given field of the new tabular data and use of the field entry vectors of the respective field entries of the given field of the new tabular data to search the embedding knowledge base for similar representative data (e.g., representative vectors representative of field types, respectively) indicative of the field type for the given field of the new tabular data. It will be appreciated that, although primarily presented herein within the context of supporting determination of field types in tabular data for particular types of tabular data (e.g., trouble ticket data) in a particular context (e.g., within a trouble ticket context of a telecommunications system), various embodiments presented herein may be configured to support determination of field types in tabular data for other types of tabular data, in other types of contexts, or the like, as well as various combinations thereof. It will be appreciated that these and various other example embodiments and advantages or potential advantages of supporting determination of field types in tabular data may be further understood by way of reference to the various figures, which are discussed further below.

FIG. 1 depicts an example embodiment of system including a tabular data processing system configured to support processing of tabular data within a trouble ticket context of a telecommunications network.

The system 100 includes a tabular data processing system 110 and a communication system 120. It will be appreciated that system 100 represents one example of an environment in which the tabular data processing system 110 may be used to support processing of tabular data and that the tabular data processing system 110 may be used to support processing of tabular data in various other contexts.

The tabular data processing system 110 is configured to process tabular data of the communication system 120, where the tabular data may include training tabular data and new tabular data. The tabular data processing system 110 may be configured to receive training tabular data (which may include tabular data having verified field type information) and process the training tabular data to produce an embedding knowledge base 111 which may then be used by the tabular data processing system 110 to process new tabular data. The tabular data processing system 110 may be configured to receive new tabular data (which may include tabular data having unverified field type information, such as where the field type information is unseen, unclear, incorrect, missing, or the like) and process the new tabular data, based on the embedding knowledge base 111, to determine (e.g., identification with certainty or prediction) field type information for at least a portion of the new tabular data. The tabular data processing system 110 may be configured to provide output data, which may include indications of the field type information determined for new tabular data, data produced based on the field type information determined for new tabular data (e.g., where the new tabular data is updated to include the field type information determined for the new tabular data), or the like, as well various combinations thereof. It will be appreciated that the output data may be organized in various formats, such as using a meta table or other suitable format(s). The generation of the embedding knowledge base 111 based on training tabular data and the use of the embedding knowledge base 111 for processing of new tabular data may be further understood by way of reference to FIG. 2.

The communication system 120 is a telecommunication system which may produce various types of data, at least some of which may be maintained as tabular data. For example, communication system 120 supports use of a communication network 121 by a set of customers 124 using a management layer 127. The communication network 121 includes a set of communication devices 122-1-122-C (collectively, communication devices 122), which may vary for different types of communication systems 120 (e.g., routers, switches, hubs, or the like), configured to support communication services which may be used by the customers 124. The customers 124 utilize the communication services of the communication network 121 using a set of customer devices 125-1-125-D (collectively, customer devices 125), which may vary for different types of communication systems 120 (e.g., computers, smartphones, set-top boxes, televisions, or the like), which may be used by the customers 124 to subscribe to services, request changes to services, submit trouble tickets, or the like, as well as various combinations thereof. The management layer 127 includes a set of management systems 128-1-128-M (collectively, management systems 128), which are configured to support use of the communication network 121 by the customers 124. For example, the management systems may include customer information management systems (e.g., one or more systems storing information about the customers 124, such as customer name, location, market, demographics, service level, support level, contact information (e.g., correspondence address, phone number, email address, and so forth), or the like), network information management systems (e.g., one or more systems storing information about the communication devices 122 and customer devices 125, such as model numbers, model names, serial numbers, Media Access Control (MAC) addresses, Internet Protocol (IP) addresses, port numbers, versions and revisions of installed components, hardware and software elements, and so forth), network provisioning systems, service provisioning systems, network monitoring systems, service monitoring systems, network trouble ticket systems for handling trouble tickets associated with problems in the communication network 121, customer trouble ticket systems for handling trouble tickets for customers 124, or the like, as well as various combinations thereof. It will be appreciated that the communication network 121 may include various other types of communication devices 122, that the various types of customers 124 may utilize various types of customer devices 125 to utilize services of communication network 121, that the management layer 127 may include various other types of management systems 128 configured to support use of the communication network 121 by the customers 124 (and which may maintain various other types of data in tabular form), or the like, as well as various combinations thereof.

The tabular data processing system 110, as noted above, is configured to process tabular data of the communication system 120 for purposes of generating the embedding knowledge base 111 based on training tabular data and using the embedding knowledge base 111 for processing new tabular data. The tabular data that is processed by the tabular data processing system 110 may include various types of data, may be formatted in various ways, may be received in various ways, or the like, as well as various combinations thereof.

The tabular data that is processed by the tabular data processing system 110 may include various types of data, which may depend on various aspects of communication system 120. For example, the tabular data may include network data (e.g., network data which is or may be reported from the communication network 121 to the management layer 127 or to customer devices 125 of the customers 124, such as network or service description information, network or service degradation information, network or service failure information, or the like, which may be provided in various forms such as in logs, reports, or the like, as well as various combinations thereof), customer data (e.g., customer data which is or may be provided from the customer devices 125 of the customers 124, automatically or by the customers 124 using the customer devices 125, to the management layer 127 or to the communication network 121, such as service request information, customer problem reporting information, or the like, which may be provided in various forms such as logs, reports, trouble tickets, or the like, as well as various combinations thereof).

The tabular data that is processed by the tabular data processing system 110 may be formatted in various ways. For example, the tabular data may be formatted using rows and columns. The columns may be referred to as fields of the tabular data and the corresponding column headers of the columns, which provide names or descriptions of the types of data included in the respective columns, may be referred to as field types, respectively. The rows may be referred to as entities, as each row may correspond to a different entity such that different types of data associated with the entity may be provided in different columns. The value that is provided at the intersection of a particular row and column may be referred to as a field entry or a field value, such that a column of the tabular data also may be referred to as a field having a set of field values of a field type. It will be appreciated that, although primarily presented with respect to embodiments in which the tabular data is organized such that a field type corresponds to a column of the tabular data, in at least some embodiments the tabular data may be organized such that a field type corresponds to a row of the tabular data.

The tabular data that is processed by the tabular data processing system 110 may be received in various ways. The tabular data may be received by the tabular data processing system 110 from the communication system 120 from any of the elements of communication system 120 (e.g., from one or more management systems 128, from one or more customer devices 125, from one or more communication devices 122, or the like, as well as various combinations thereof). The tabular data that is processed by the tabular data processing system 110 may be generated by management systems 128 of the management layer 127 automatically (e.g., based on network data received from communication network 121, customer data received from customer devices 125 or from customers 124 using the customer devices 125, or the like), may be generated by technicians using management systems 128 of the management layer 127 (e.g., based on analysis of network data from the communication network 121, based on conversations with customers 124 via customer devices 125, or the like, as well as various combinations thereof).

It will be appreciated that the tabular data that is processed by the tabular data processing system 110 may include various other types of data, may be received in various other ways, or the like, as well as various combinations thereof.

Figure 2:
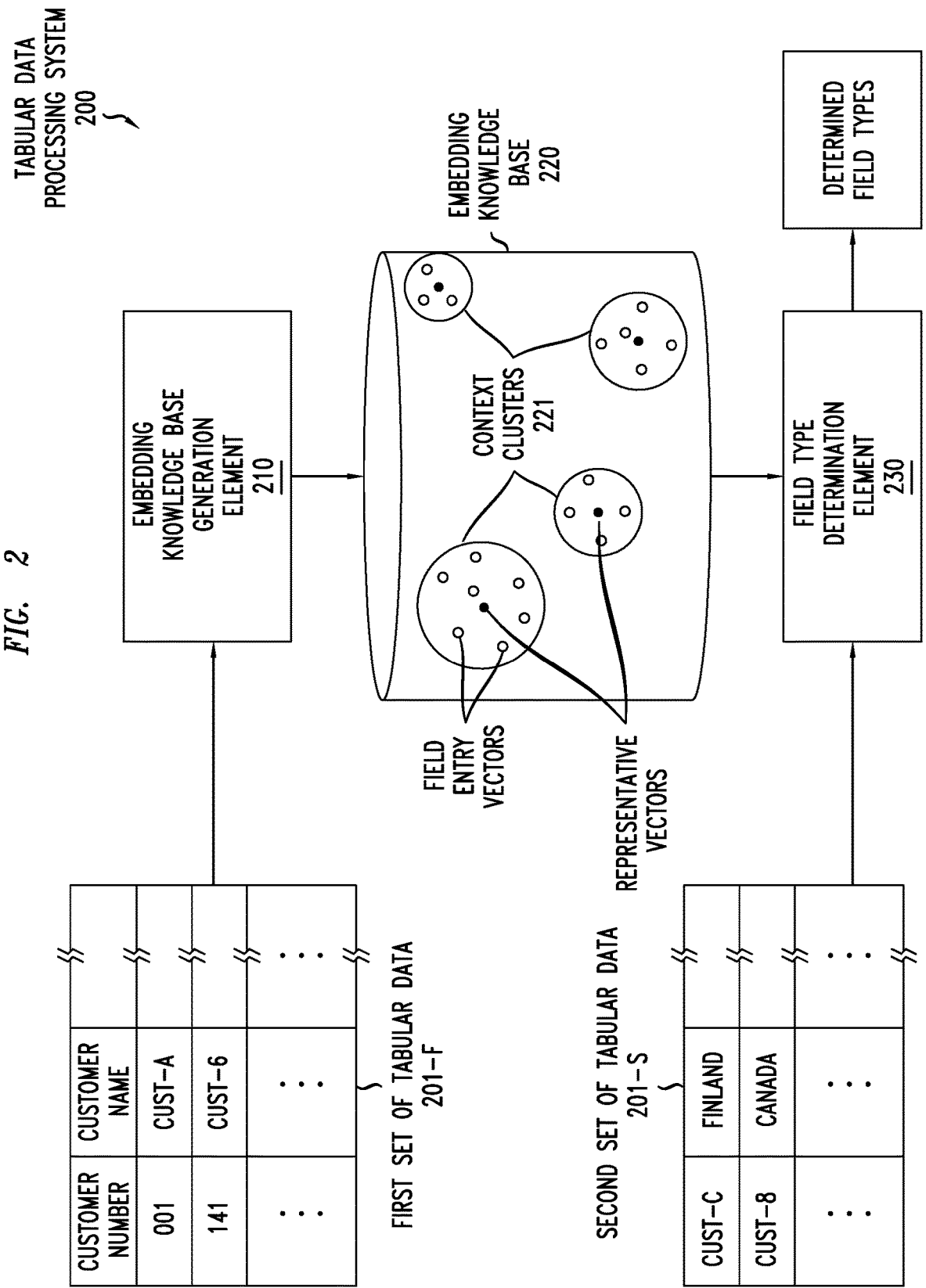
FIG. 2 depicts an example embodiment of a tabular data processing system configured to support processing of tabular data in a manner enabling determination of field types of fields in tabular data.

It will be appreciated that the processing of tabular data of the communication system 120 by the tabular data processing system 110, for purposes of generating the embedding knowledge base 111 based on training tabular data and for the purposes of using the embedding knowledge base 111 for processing new tabular data, may be further understood by way of reference to FIG. 2.

FIG. 2 depicts an example embodiment of a tabular data processing system configured to support processing of tabular data in a manner enabling determination of field types of fields in tabular data.

The tabular data processing system 200 includes an embedding knowledge base generation element 210, an embedding knowledge base 220, and a field type determination element 230.

The embedding knowledge base generation element 210 of the tabular data processing system 200 receives a first set of tabular data 201-F and generates the embedding knowledge base 220 based on the first set of tabular data 201-F. The first set of tabular data 201-F may be training data configured for use in generating the embedding knowledge base 220.

The first set of tabular data 201-F includes a set of fields having respective field types associated therewith. In the first set of tabular data 201-F, the fields are defined by the columns of the tabular data (namely, the column headings or names correspond to field types with the entries, or values, in the columns representing sets of field entries for the field types, respectively). In other words, for any given column, the set of cells in that column may be considered to be a set of field entries having a field type associated therewith (e.g., a CUSTOMER NUMBER field type having customer number values listed in the cells below for different customers, a CUSTOMER NAME field type having customer name entries in the cells below for the different customers, and so forth). The first set of tabular data 201-F include tabular data from one or more data sources. It will be appreciated that, although primarily presented with respect to embodiments in which the fields of the first set of tabular data 201-F are defined by columns of the tabular data, in at least some embodiments the fields may be defined by rows of the tabular data (e.g., the row headings or names correspond to field types with cells across the rows representing sets of field entries for the field types, respectively).

The embedding knowledge base 220 includes, for each of the field types in the first set of tabular data 201-F, a respective context cluster 221 for the respective field type. The context clusters 221 for the field types are configured to be representative of the field types and, as discussed further below, may be used to determine field types for fields of tabular data (e.g., new tabular data received and processed based on the embedding knowledge base 220). The context cluster 221 for a given field type includes a set of field entry vectors representing individual field entries of the given field type (the unfilled circles depicted within the circle that represents the respective context cluster 221 for the given field type, with each unfilled circle representing a field entry vector for a field entry of that field type, respectively) and a representative vector that is configured to be representative of the given field type (the single filled circle depicted near the center of the circle that represents the respective context cluster 221 for the given field type). For example, where one of the context clusters 221 in the embedding knowledge base 220 is associated with the CUSTOMER NUMBER column of the first set of tabular data 201-F, the field entry vectors may represent field entries in the cells of the CUSTOMER NUMBER column and the representative vector may represent the CUSTOMER NUMBER field type of the CUSTOMER NUMBER column. Similarly, for example, where one of the context clusters 221 in the embedding knowledge base 220 is associated with the CUSTOMER NAME column of the first set of tabular data 201-F, the field entry vectors may represent field entries in the cells of the CUSTOMER NAME column and the representative vector may represent the CUSTOMER NAME field type of the CUSTOMER NAME column. It will be appreciated that other context clusters 221 represent other field types of the first set of tabular data 201-F.

The embedding knowledge base generation element 210 generates the embedding knowledge base 220 by determining the context clusters 221 representative of the respective field types of the first set of tabular data 201-F and storing the context clusters 221 representative of the respective field types of the first set of tabular data 201-F.

The embedding knowledge base generation element 210 may determine a context cluster 221 for a field type by determining the field entry vectors for the field entries in the field for the field type and determining the representative vector of the field type based on the field entry vectors for the field entries in the field for the field type.

The embedding knowledge base generation element 210, as discussed further below, may determine a field entry vector for a field entry of a field of a field type based on use of representation learning using context (e.g., positive context for the field entry and negative context for the field entry), character embeddings (e.g., for the field entry and for other field entries selected as positive and negative context for the field entry, respectively), and log-likelihood processing (e.g., based on field analysis vectors determined for the field entry and for other field entries selected as positive and negative context for the field entry, respectively).

The embedding knowledge base generation element 210 may determine a field entry vector for a field entry of a field type by determining, from the first set of tabular data 201-F, the field entry and context information associated with the field entry, and processing the field entry and the context information associated with the field entry to determine the field entry vector for the field entry of the field type. Here, the field entry for which the field entry vector is determined may be referred to as a focus field entry in order to distinguish it from other field entries which may be used as the context information for the focus field entry. The context information associated with the focus field entry includes positive context information for the focus field entry and negative context information for the focus field entry. The positive context information for the focus field entry includes at least one other field entry in the same field as the field entry (i.e., one or more values from one or more other cells of the same column of the field entry). The positive context information for the focus field entry may include any suitable number of field entries from the same field as the focus field entry, each of which may be selected randomly from the set of available field entries of that field (e.g., each of the other field entries in that column). The negative context information for the focus field entry includes at least one field entry from at least one other field, other than the field of the focus field entry, of the first set of tabular data 201-F (e.g., one or more values from one or more other cells of one or more other columns). The negative context information for the focus field entry may include any suitable number of field entries from one or more fields other than the field of the focus field entry, each of which may be selected randomly from one or more sets of available field entries of the one or more fields other than the field of the focus field entry (e.g., each of the other field entries in each of the other columns).

The processing of the focus field entry and the context information associated with the focus field entry, to determine the field entry vector for the focus field entry of the field type, may be performed using a set of convolutional neural network (CNN) encoders and a log-likelihood analysis element. The focus field entry and the positive context and negative context for the focus field entry may be input into respective convolutional neural network encoders, respectively, the outputs of which may be respective field analysis vectors for the focus field entry and the positive context and negative context of the focus field entry, respectively. In general, a field analysis vector is the output of a convolutional neural network encoder for a particular field entry (e.g., the focus field entry, a field entry being used as positive context for the focus field entry, a field entry being used as negative context for the focus field entry, or the like). The convolutional neural network encoders may be configured to determine the field analysis vectors for the focus field entry by operating on the sequences of character embeddings of the field entries being processed for determining the field entry vector for the focus field entry (namely, the focus field entry, any field entry being used as positive context for the focus field entry, and any field entry being used as negative context for the focus field entry). The field analysis vectors for the focus field entry (namely, a field analysis vector for the focus field entry, one or more field analysis vectors associated with one or more field entries being used as positive context for the focus field entry, and one or more field analysis vectors associated with one or more field entries being used as negative context for the focus field entry) may be input into the log-likelihood analysis element, the output of which may be the field entry vector for the focus field entry of the field type. The log-likelihood analysis element may be configured to determine the field entry vector for the focus field entry of the field type in a manner for maximizing (or at least attempting to maximize) the likelihood of positive context and minimizing (or at least attempting to minimize) the likelihood of negative context.

The convolutional neural network encoders, as indicated above, may be configured to determine the field analysis vectors for the focus field entry by operating on the sequences of character embeddings of the field entries being processed for determining the field entry vector for the focus field entry (namely, the focus field entry, any field entry being used as positive context for the focus field entry, and any field entry being used as negative context for the focus field entry). Here, the field entry that is processed by a convolutional neural network encoder to generate a corresponding field analysis vector may be referred to as a target field entry so as to more generally encompass references to the different types of field entries (namely, the focus field entry, positive context field entries, and negative context field entries) which may be processed for determining the field entry vector for the focus field entry. The processing of a target field entry by a convolutional neural network encoder to generate the field analysis vector for the target field entry may be performed by determining character embeddings for the target field entry, applying convolutional filters, concatenating the outputs of the convolutional filters to form a concatenated vector, and employing a linear layer to map the concatenated vector to a dense vector which may be treated as the field analysis vector for the target field entry. It will be appreciated that, as a result, the field analysis vector may be considered to be a dense character-based embedding of the target field entry. The use of a convolutional neural network encoder configured to process a target field entry in order to provide a field analysis vector for the target field entry may be further understood with respect to FIG. 4.

The processing of a target field entry by a convolutional neural network encoder to generate the field analysis vector for the target field entry, as indicated above and discussed further below, may be performed by determining character embeddings for the target field entry, applying convolutional filters with non-linear activation, concatenating the outputs of the convolutional filters to form a concatenated vector, and employing a linear layer to map the concatenated vector to a dense vector which may be treated as the field analysis vector for the target field entry.

The processing of a target field entry by a convolutional neural network encoder to generate the field analysis vector for the target field entry, as indicated above, may be performed based on determination of character embeddings for the target field entry. In at least some embodiments, for the character embeddings, the input character vocabulary may be defined as consisting of 70 alphanumeric ASCII characters in which each of the characters may be represented as a 128-dimensional real-valued vector. This vector may be initialized to random samples from a Gaussian distribution (e.g., with a mean of zero (0) and a standard deviation of one (1)) and may be updated during the training process. It will be appreciated that the input character vocabulary may be defined in other ways.

The processing of a target field entry by a convolutional neural network encoder to generate the field analysis vector for the target field entry, as indicated above, may be performed based on application of convolutional filters. In at least some embodiments, the model learns to map each target field entry to a dense vector by applying convolutional filters on the sequence of character embeddings. In at least some embodiments, using a maximum sequence length, convolutional filters of varying window size may be used to capture the sub-string patterns of varying length into the character embeddings. For example, using a maximum sequence length of 100 characters, convolutional filters of window size 2, 3, 5, and 10, respectively, may be applied, followed by a non-linear activation (e.g., the Rectified Linear Unit (ReLU) or other suitable element configured for non-linear activation). It will be appreciated that other maximum sequence lengths may be used, other numbers of convolutional filters may be used, other convolutional filter window sizes may be used, or the like, as well as various combinations thereof.

The processing of a target field entry by a convolutional neural network encoder to generate the field analysis vector for the target field entry, as indicated above, may be performed based on concatenation of the outputs of the convolutional filters to form a concatenated vector. In at least some embodiments, the outputs of the convolutional filters may be concatenated after using one-dimensional (1D) max-pooling. For example, the outputs of the convolutional filters may be concatenated after using 1D max-pooling to generate a 109-dimensional vector. In at least some embodiments, a portion of the units may be randomly dropped from the concatenated vector (e.g., to avoid overfitting). For example, in order to avoid overfitting, a dropout rate (e.g., 10%, 20%, 25%, or the like) may be used to randomly drop some of the units from the 109-dimensional vector. It will be appreciated that other types of max-pooling may be used, other types of pooling may be used, or the like.

The processing of a target field entry by a convolutional neural network encoder to generate the field analysis vector for the target field entry, as indicated above, may be performed based on employment of a linear layer to map the concatenated vector to a dense vector which may be treated as the field analysis vector for the target field entry. In at least some embodiments, the linear layer may be a fully-connected linear layer. For example, a fully-connected linear layer may be used to map the 109-dimensional vector to a lower-dimensional vector (e.g., a 40-dimensional vector, a 50-dimensional vector, a 60-dimensional vector, or the like) which may be treated as the dense embedding of the target field entry (namely, the field analysis vector for the target field entry). It will be appreciated that other types of fully-connected linear layers may be used, other types of linear layers may be used, or the like.

The convolutional neural network encoders, as indicated above, provide the field analysis vectors for the focus field entry (namely, a field analysis vector for the focus field entry, one or more field analysis vectors associated with one or more field entries being used as positive context for the focus field entry, and one or more field analysis vectors associated with one or more field entries being used as negative context for the focus field entry) to the log-likelihood analysis element for determination of the field entry vector for the focus field entry of the field type.

The log-likelihood analysis element, as indicated above, may be configured to receive the field analysis vectors for the focus field entry (namely, a field analysis vector for the focus field entry, one or more field analysis vectors associated with one or more field entries being used as positive context for the focus field entry, and one or more field analysis vectors associated with one or more field entries being used as negative context for the focus field entry) and process the field analysis vectors associated with the focus field entry to determine the field entry vector for the focus field entry of the field type. The log-likelihood analysis element may be configured to determine the field entry vector for the focus field entry of the field type, based on the field analysis vectors associated with the focus field entry, in a manner for maximizing (or at least attempting to maximize) the likelihood of positive context and minimizing (or at least attempting to minimize) the likelihood of negative context.

The log-likelihood analysis element may be configured to determine the field entry vector for the focus field entry of the field type by training the model to minimize a loss function that is based on the likelihood of positive context given the focus field entry and the likelihood of negative context given the focus field entry. Here, assume that v denotes the focus field entry and represents the corresponding field analysis vector, $v_p \in V_+$ represents a sample field entry from the positive context and $v_p$, represents the corresponding field analysis vector, and $v_n \in V_-$ denotes a sample field entry from the negative context and $v_n$, represents the corresponding field analysis vector. The likelihood of a positive context given the focus field entry may be obtained as: $p(v_p|v; \theta) = [\exp(v^T v_{p+})]/\Sigma_{v'_p \in V_+} \exp(v^T v'_{p+})$, where $\theta$ represents the set of learnable parameters of the model. The likelihood of a negative context given the focus field entry may be obtained as: $p(v_n|v; \theta) = [\exp(v^T v_{n+})]/\Sigma_{v'_n \in V_-} \exp(v^T v'_{n+})$, where $\theta$ represents the set of learnable parameters of the model. The model may be trained to minimize the following loss (objective) function:

$$\mathcal{L}(\theta) = -\frac{1}{|V_+|}\sum_{v_p} \log p(v_p|v;\theta) + \frac{1}{|V_-|}\sum_{v_n} \log p(v_n|v;\theta),$$

where |V.| is the cardinality of the given set of samples. The result is the field entry vector for the focus field entry of the field type.

It will be appreciated that, for each field entry of the field type that is to be processed for determining the field entry vector for the field entry, any suitable amount of context information may be used. For example, the context information associated with a focus field entry that is used for determining the field entry vector for the focus field entry may include one positive context field entry and one negative context field entry (thereby resulting in three field analysis vectors to be processed by the log-likelihood analysis element, including one field analysis vector for the focus field entry, one field analysis vector for the positive context field entry, and one field analysis vector for the negative context field entry), two positive context field entries and two negative context field entries (thereby resulting in five field analysis vectors to be processed by the log-likelihood analysis element, including one field analysis vector for the focus field entry, two field analysis vectors for the two positive context field entries, and two field analysis vectors for the two negative context field entries), three positive context field entries and three negative context field entries (thereby resulting in seven field analysis vectors to be processed by the log-likelihood analysis element, including one field analysis vector for the focus field entry, three field analysis vectors for the three positive context field entries, and three field analysis vectors for the three negative context field entries), or the like. It will be appreciated that other amounts of context information may be used for determining the field entry vectors for field entries of the field type that are to be processed for determining the field entry vector for the field entry, that the amount of context information used for determining field entry vectors for field entries of the field type that are to be processed for determining the field entry vector for the field entry may vary (e.g., for field entries of the same field type, across field types, or the like), or the like, as well as various combinations thereof.

The log-likelihood analysis element may be configured to store the field entry vector for the field entry from the field of the field type in the embedding knowledge base 220. The field entry vector for the field entry from the field of the field type may be stored in the embedding knowledge base 220 in a manner for associating the field entry vector with the field type, such that any field entry vectors associated with that field type may form the context cluster 221 for the field type (e.g., with each unfilled circle of the context cluster 221 representing the field entry vector for the field entry of that field type, respectively) and, further, such that the field entry vectors associated with that field type may be processed to determine the representative vector of the field type (e.g., represented as the single filled circle depicted near the center of the circle that represents the context cluster 221 of that field type).

It will be appreciated that the embedding knowledge base generation element 210, for purposes of obtaining the field entry vectors for the field entries from the field of the field type, may repeat, for each of the field entries from the field of the field type (or at least a representative set of field entries from the field of the field type), the above-described process of generating a field entry vector for a field entry from the field of field type (namely, for each of one or more field entries in a particular column of the first set of tabular data 201-F, a corresponding field entry vector for the field entry may be determined by determining the field entry and context information associated with the field entry and processing the field entry and the context information associated with the field entry, based on use of the convolutional neural network encoders and the log-likelihood analysis element, to determine the field entry vector for the field entry).

The embedding knowledge base generation element 210 may determine a representative vector of a field type based on the field entry vectors for the field entries in the field of the field type. The embedding knowledge base generation element 210 may determine the representative vector of a field type, based on the field entry vectors for the field entries in the field of the field type, by determining an element-wise mean of the field entry vectors of the field entries in the field of the field type. In this manner, the element-wise mean vector of the field entry vectors of the field entries in the field of the field type may be considered to be the centroid of the context cluster 221 that represents that field type (namely, the single filled circle depicted near the center of the circle that represents the context cluster 221 for that field type). It will be appreciated that the centroid of a context cluster 221 may be computed in other ways (e.g., using a mechanism other than element-wise mean).

The embedding knowledge base generation element 210 stores the representative vector of the field type in the embedding knowledge base 220. The embedding knowledge base generation element 210 may store the representative vector of the field type in the embedding knowledge base 220 in a manner for associating the representative vector of the field type with the field type. The embedding knowledge base 220, for a given field type, may store the representative vector of the field type in a manner for associating the representative vector of the field type with the field type using a key-value pair, where the key is the field type and the value is the representative vector for the field type. It will be appreciated that the embedding knowledge base 220 may include such key-value pairs for each of the field types. It will be appreciated that the embedding knowledge base 220, as discussed above, also may store the sets of field entry vectors associated with the field types that are used to determine the representative vectors for the field types, respectively.

The field type determination element 230 of the tabular data processing system 200 receives a second set of tabular data 201-S and processes the second set of tabular data 201-S based on the embedding knowledge base 220. The second set of tabular data 201-S may include any tabular data which may be analyzed based on the embedding knowledge base 220.

The second set of tabular data 201-S includes a set of fields for which at least a portion of the field type information may not be adequate (e.g., unseen, unclear, incorrect, missing, labeled with incorrect or uncertain names or other description information, or the like). In this example, the field type information (namely, the column headings for the columns of data) is missing from the second set of tabular data 201-S, such that the type of data included in each of the fields (again, columns) may not be discernable, or at least not easily discernable, from the second set of tabular data 201-S. The second set of tabular data 201-S may include tabular data from one or more data sources. It will be appreciated that, although primarily presented with respect to embodiments in which the fields of the second set of tabular data 201-S are defined by columns of the tabular data, in at least some embodiments the fields may be defined by rows of the tabular data (e.g., the row headings or names correspond to field types with cells across the rows representing sets of field entries for the field types, respectively).

The field type determination element 230 may process the second set of tabular data 201-S, based on the embedding knowledge base 220, in a manner for determining field type information for the second set of tabular data 201-S. It will be appreciated that, here, the determining of the field type may be considered to be identification of the field type (e.g., if the field type is identified with certainty or at least a threshold level of certainty) or prediction of the field type (e.g., the field type is predicted to be correct with at least some level of confidence).

The field type determination element 230 may determine the field type for a given field of the second set of tabular data 201-S. The field type determination element 230 may determine the field type for a given field of the second set of tabular data 201-S by determining one or more field entry vectors for the given field and analyzing the one or more field entry vectors for the given field using the embedding knowledge base 220 for determining the field type for the given field of the second set of tabular data 201-S. The one or more field entry vectors for the given field may be determined based on processing of one or more field entries of the given field, respectively. The one or more field entry vectors for the given field may be determined using the convolutional neural network encoder that was used to generate the embedding knowledge base 220 (e.g., processing each of the one or more field entries of the given field using the convolutional neural network encoder). The field type determination element 230 may determine the field type for the given field of the second set of tabular data 201-S by comparing each of the one or more field entry vectors for the given field of the second set of tabular data 201-S with one or more of the representative vectors of one or more of the context clusters 221 of the embedding knowledge base 220. The field type determination element 230 may determine the field type for the given field of the second set of tabular data 201-S by comparing each of the one or more field entry vectors for the given field of the second set of tabular data 201-S with representative vectors of one or more of the context clusters 221 until finding the first context cluster 221 that matches with at least a threshold level of confidence, comparing each of the one or more field entry vectors for the given field of the second set of tabular data 201-S with all of the representative vectors of all of the context clusters 221 and selecting the context cluster 221 that matches with the highest level of confidence, comparing each of the one or more field entry vectors for the given field of the second set of tabular data 201-S with all of the representative vectors of all of the context clusters 221 and using a tie-breaking mechanism to select one of the context clusters 221 from among ones of the context clusters 221 matching with levels of confidence above a threshold, or the like. It will be appreciated that the field type determination element 230 may determine the field type for a given field of the second set of tabular data 201-S in other ways.

The field type determination element 230 may determine the field type for a given field of the second set of tabular data 201-S based on use of one or more vector representations of one or more field entries of the field, similarity comparisons based on the embedding knowledge base 220, and voting based on results of the similarity comparisons.

The vector representations of the field entries of the field may be determined by feeding each of the field entries of the field into a trained convolutional neural network encoder to obtain dense embeddings of the field entries that are used as the vector representations of the field entries of the field (and which also may be referred to herein as field entry vectors).

The similarity comparisons based on the embedding knowledge base 220 may be based on vector matching evaluation techniques which may be used to evaluate the similarity between a given pair of vectors being compared (e.g., for pair-wise comparisons of each of the field entry vectors of the field to each of representative vectors which are the centroids of the context clusters 221 of the embedding knowledge base 220). In at least some embodiments, the similarity comparisons based on the embedding knowledge base 220 may be cosine similarities between the field entry vectors of the field and each of the representative vectors which are the centroids of the context clusters 221 of the embedding knowledge base 220. It will be appreciated that other types of similarity comparisons may be used.

The voting based on the results of the similarity comparisons may include majority voting (e.g., selecting the field type matching a majority of the field entries of the field), top result voting (e.g., selecting the field types matched by the most field entries of the field (e.g., top three matching field types in terms of number of field entries of the field matched, top five matching field types in terms of number of field entries of the field matched, or the like), tie-based voting (e.g., field types having matches that are tied), or the like, as well as various combinations thereof. In at least some embodiments, in which majority voting is used, the majority voting includes using a majority voting of maximum cosine similarity scores with at least 50% support to predict the field type of the field (e.g., if the embedding knowledge base 220 includes N context clusters 221 for N field types labeled as field types $F_1$ through $F_N$ and if there are 1000 field entries in a field and 500 of those field entries are predicted by the model to be similar to field $F_2$ of the embedding knowledge base 220, then the model will assign the field to be similar to field $F_2$ of the embedding knowledge base with 50% confidence). It will be appreciated that other types of voting schemes may be used.

The tabular data processing system 200 may be configured to perform additional functions after determining field type information for the second set of tabular data 201-S. For example, the tabular data processing system 200 may be configured to annotate the second set of tabular data 201-S (e.g., to include the field type information as a proper heading for the field of that field type), provide the field type information to one or more systems for further analysis, to provide the field type information to one or more user devices for further analysis by one or more users, or the like, as well as various combinations thereof.

Figure 3:
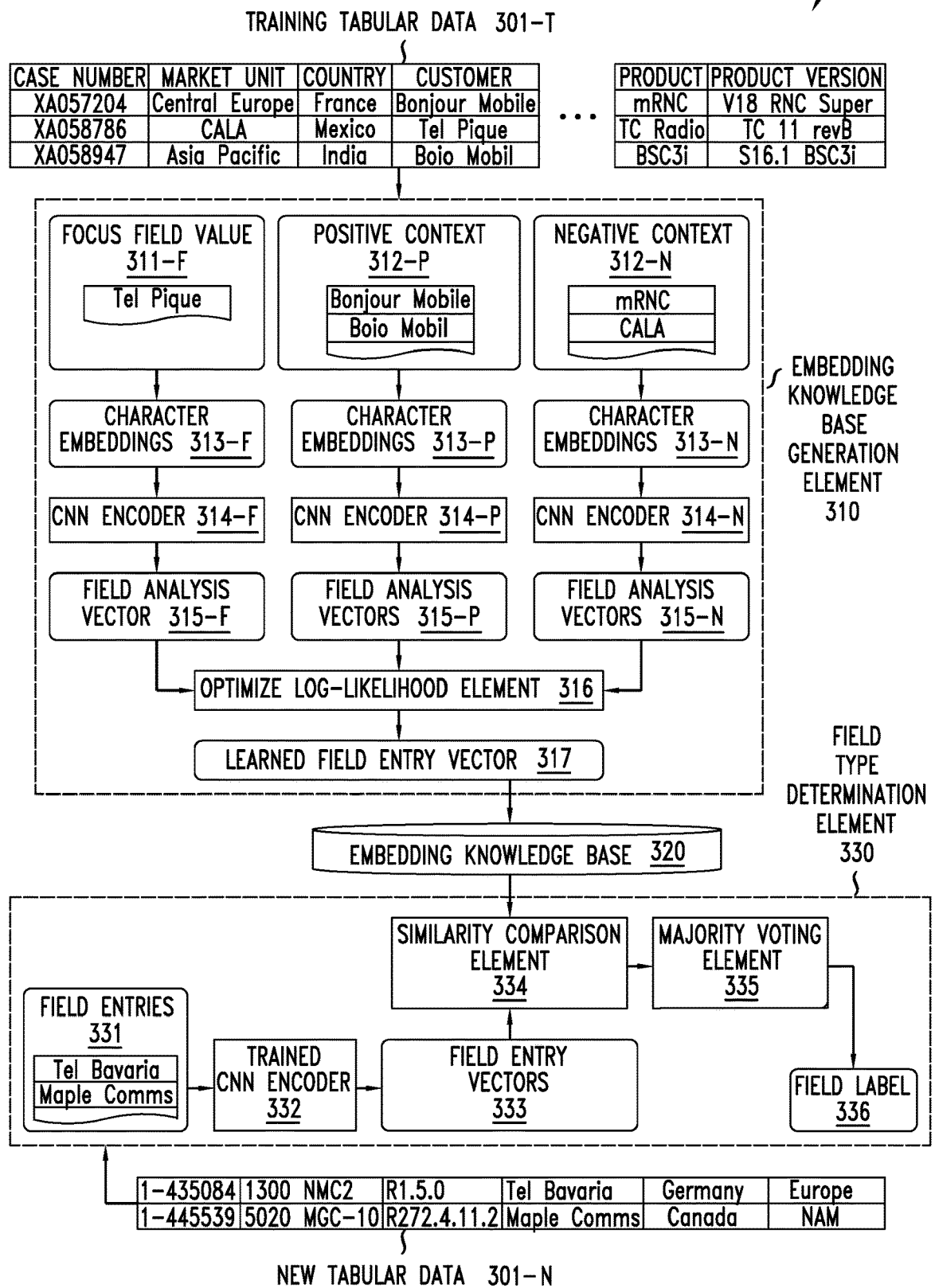
FIG. 3 depicts an example embodiment of a tabular data processing system configured to support processing of tabular data in a manner enabling determination of field types of fields in tabular data.

It will be appreciated that the operation of tabular data processing system 200 in processing of tabular data, for purposes of generating the embedding knowledge base 220 based on training tabular data and for the purposes of using the embedding knowledge base 220 for processing new tabular data, may be further understood by way of reference to FIG. 3.

FIG. 3 depicts an example embodiment of a tabular data processing system configured to support processing of tabular data in a manner enabling determination of field types of fields in tabular data.

The tabular data processing system 300 of FIG. 3 may be configured to operate in a manner similar to the tabular data processing system 200 of FIG. 2.

The tabular data processing system 300 includes an embedding knowledge base generation element 310, an embedding knowledge base 320, and a field type determination element 330.

The embedding knowledge base generation element 310 of the tabular data processing system 300 receives a set of training tabular data 301-T and updates the embedding knowledge base 320, based on the set of training tabular data 301-T, to include field type reference information which may be used by the field type determination element 330 for field type determination. The field type determination element 330 of the tabular data processing system 300 receives a set of new tabular data 301-N and processes the set of new tabular data 301-N, based on the embedding knowledge base 320 which includes the field type reference information added to the embedding knowledge base 320 by the embedding knowledge base generation element 310, for field type determination. In the example of FIG. 3, the field type that is used to describe generation of the embedding knowledge base 320 by embedding knowledge base generation element 310 use of the embedding knowledge base 320 by the field type determination element 330, is a CUSTOMER field type.

The set of training tabular data 301-T includes a plurality of fields having respective field types associated therewith. In the set of training tabular data 301-T, the fields are CASE NUMBER, MARKET UNIT, COUNTRY, CUSTOMER, PRODUCT, and PRODUCT VERSION (among others which are omitted). In the example of FIG. 3, one of the field entries from the CUSTOMER field type is processed in order to generate or update a representation of that field type in the embedding knowledge base 320. That field entry, which is denoted in FIG. 3 as the focus field value 311-F, is Tel Pique.

The embedding knowledge base generation element 310 determines positive context 312-P for the focus field value 311-F and determines negative context 312-N for the focus field value 311-F. The positive context 312-P may include one or more field entries from the same column as the focus field value 311-F. In this example, the field entries of the positive context 312-P are values identifying two additional customers denoted as Bonjour Mobile and Boio Mobil. The negative context 312-N may include one or more field entries from one or more columns other than the column of the focus field value 311-F and from one or more rows (which may include the same row as the focus field value 311-F and/or one or more rows other than the row of the focus field value 311-F). In this example, the field entries of the negative context 312-N include a field entry from the PRODUCT column (having a value denoted as mRNC) and a field entry from the MARKET UNIT column (having a value denoted as CALA), both of which are on different rows than the focus field value 311-F.

The embedding knowledge base generation element 310 generates character embeddings 313 for the characters in the focus field value 311-F (denoted as character embeddings 313-F) and for the characters in each of the field entries of the positive context 312-P (denoted as character embeddings 313-P for field entries of the positive context 312-P, respectively) and for the characters in each of the field entries of the negative context 312-N (denoted as character embeddings 313-N for field entries of the negative context 312-N, respectively). The character embeddings 313 are the character embeddings prior to application of convolution filters to produce associated field analysis vectors (which may be dense embeddings, as discussed further below), respectively. The character embeddings 313 may be initialized to random samples from a Gaussian distribution (e.g., with a mean of zero (0) and a standard deviation of one (1)) and may be updated during the training process to align the character embeddings 313 in such a way that there is "correspondence" between the character embeddings and the associated field analysis vectors. It is noted that the various field entries associated with the focus field entry being processed (namely, focus field value 311 and the field entries of positive context 312-P and negative context 312-N) may be represented using character embeddings (namely, the character embeddings 313) since character-wise learning may be more efficient and useful than word-wise learning for the semi-structured text of the training tabular data 301-T (e.g., where such semi-structured text may include alphanumeric and special characters which can represent information tending to have a lack of commonly understood context for those without domain knowledge (e.g., identifiers, jargon, fragmented terms (e.g., acronyms), or the like)).

The embedding knowledge base generation element 310 puts the character embeddings 313 through convolutional neural network (CNN) encoders 314, respectively, to produce the field analysis vectors 315 for the focus field value 311-F and for the positive context 312-P and the negative context 312-N. The field analysis vectors 315 include a field analysis vector 315-F for the focus field value 311-F, one or more field analysis vectors 315-P for the positive context 312-P (namely, one field analysis vector 315-P for each of the field entries included in the positive context 312-P), and one or more field analysis vectors 315-N for the negative context 312-N (namely, one field analysis vector 315-N for each of the field entries included in the negative context 312-N). It will be appreciated that the field analysis vectors 315 output by the CNN encoders 314 may be dense embeddings produced based on a training process that is configured to align the character embeddings 313 in such a way that there is "correspondence" (e.g., based on a mapping function, where the mapping function may include one or more linear or non-linear transformations (e.g., convolutional filters, max-pooling, dropout, fully-connected layers, or the like, as well as various combinations thereof) between the character embeddings 313 and the associated dense embeddings used as the field analysis vectors 315. An example embodiment of a CNN encoder 314 configured to produce a field analysis vector 315 (as a dense embedding) based on character embeddings 313 is presented with respect to FIG. 4. It will be appreciated that the field analysis vectors 315 output by the CNN encoders 314 may correspond to the field analysis vectors described with respect to the tabular data processing system 200 of FIG. 2.

The embedding knowledge base generation element 310 processes the field analysis vectors 315 output by the CNN encoders 314, using the optimize log-likelihood element 316, to produce the learned field entry vector 317 for the focus field value 311-F of the field type. The optimize log-likelihood element 316 may be configured to determine the learned field entry vector 317 in a manner for maximizing (or at least attempting to maximize) the likelihood of positive context and minimizing (or at least attempting to minimize) the likelihood of negative context. In the example of FIG. 3, the learned field entry vector 317 may include a representation of the focus field value 311-F (Tel Pique). It will be appreciated that the learned field entry vector 317 may correspond to one of the field entry vectors depicted and described with respect to the tabular data processing system 200 of FIG. 2.

The embedding knowledge base generation element 310 updates the embedding knowledge base 320 based on the learned field entry vector 317.

The updating of the embedding knowledge base 320 based on the learned field entry vector 317, if the embedding knowledge base 320 does not include a context cluster for the field type (namely, CUSTOMER) of the focus field value 311-F, may include generation of a new context cluster for the field type (again, CUSTOMER) that includes the learned field entry vector 317 (which then also may be considered to be centroid of the context cluster since it is the only learned field entry vector 317 for that field type).

The updating of the embedding knowledge base 320 based on the learned field entry vector 317, if the embedding knowledge base 320 already includes a context cluster for the field type (namely, CUSTOMER) of the focus field value 311-F, may include adding the learned field entry vector 317 to the context cluster for the field type and updating the representative vector of the context cluster for the field type based on the learned field entry vector 317 (which also may be considered to be updating of the centroid of the context cluster based on the learned field entry vector 317 for that field type).

It will be appreciated that labeling of the field type for a context cluster may be determined in various ways. For example, labeling of the field type for a context cluster may be determined by using the field type from the training tabular data 301-T as the label for the field type (e.g., where only a single column of data having a single column heading has been processed for determining the context cluster), by computing the label for the field type from multiple field types from the training tabular data 301-T (e.g., where multiple columns of data having multiple column headings have been processed for determining the context cluster), by using an externally supplied name as the label for the field type, or the like.

It will be appreciated that the embedding knowledge base 320 may be updated in other ways based on the learned field entry vector 317 (e.g., in terms of the information that is stored, the manner in which the information is stored (e.g., how mappings of values or information are maintained), or the like, as well as various combinations thereof).

It will be appreciated that the functions performed by embedding knowledge base generation element 310 may be repeated for multiple field entries of the training tabular data 301-T to produce multiple learned field entry vectors 317 which may be used to generate the embedding knowledge base 320 (e.g., multiple field entries of the same field or across multiple fields may be processed to produce one or more context clusters for one or more field types based on the training tabular data 301-T).

The set of new tabular data 301-N includes a plurality of fields that do not have respective field types associated therewith, such that it may be difficult to determine which types of data are included in the various fields. In the example of FIG. 3, field entries from one of the fields having an undetermined field type are processed, using the embedding knowledge base 320, in order to determine the field type of the one of the fields having the determined field type.

The field type determination element 330 selects one of the fields for which the field type is to be determined and obtains one or more field entries 331 of the selected field. The field type determination element 330 obtains the one or more field entries 331 of the selected field from the set of new tabular data 301-N. In the example of FIG. 3, the field entries 331 of the selected field are Tel Bavaria and Maple Comms. It will be appreciated that fewer or more field entries may be selected from the one of the fields having the undetermined field type in order to determine the field type of the one of the fields having the determined field type.

The field type determination element 330 provides the field entries 331 of the selected field to a trained CNN encoder 332, which generates field entry vectors 333 based on the field entries 331, respectively. It will be appreciated that the field entry vectors 333 output by the trained CNN encoder 332 may be dense embeddings produced based on training of the trained CNN encoder 332 using a training process that is configured to align character embeddings of the field entries 331 in such a way that there is "correspondence" (e.g., based on a mapping function, where the mapping function may include one or more linear or non-linear transformations (e.g., convolutional filters, max-pooling, dropout, fully-connected layers, or the like, as well as various combinations thereof) between the character embeddings of the field entries 331 and the associated dense embeddings used as the field entry vectors 333. An example embodiment of a trained CNN encoder 314 configured to produce a field entry vector 333 (as a dense embedding) based on character embedding 313 of a field entry 331 is presented with respect to FIG. 4.

The field type determination element 330 uses a similarity comparison element 334 to compare the field entry vectors 333 to the embedding knowledge base 320 (namely, to representative vectors of context clusters of the embedding knowledge base 320). The similarity comparison element 334 may determine, for each of the field entries 331 based on the respective field entry vectors 333 for the field entries 331, one or more representative vectors (and, thus, associated context clusters) matching or similar to the field entry vector 333 for the field entry 331.

The field type determination element 330 uses a majority voting element 335 to determine the field type for the field entries 331 of the selected field. The majority voting element 335 may, where the field entry vectors 333 for different ones of the field entries 331 matched different sets of representative vectors of the embedding knowledge base 320 (and, thus, different context clusters associated with different field types), select one of the representative vectors (and associated field type of the corresponding context cluster) as the representative vector that is most likely to represent the selected field based on use of majority voting techniques. The majority voting element 335 then outputs the field type determined as the most likely field type for the selected field (denoted as field label 336).

It will be appreciated that various functions presented with respect to the tabular data processing system 200 of FIG. 2 also may be utilized within the tabular data processing system 300 of FIG. 3.

Figure 4:
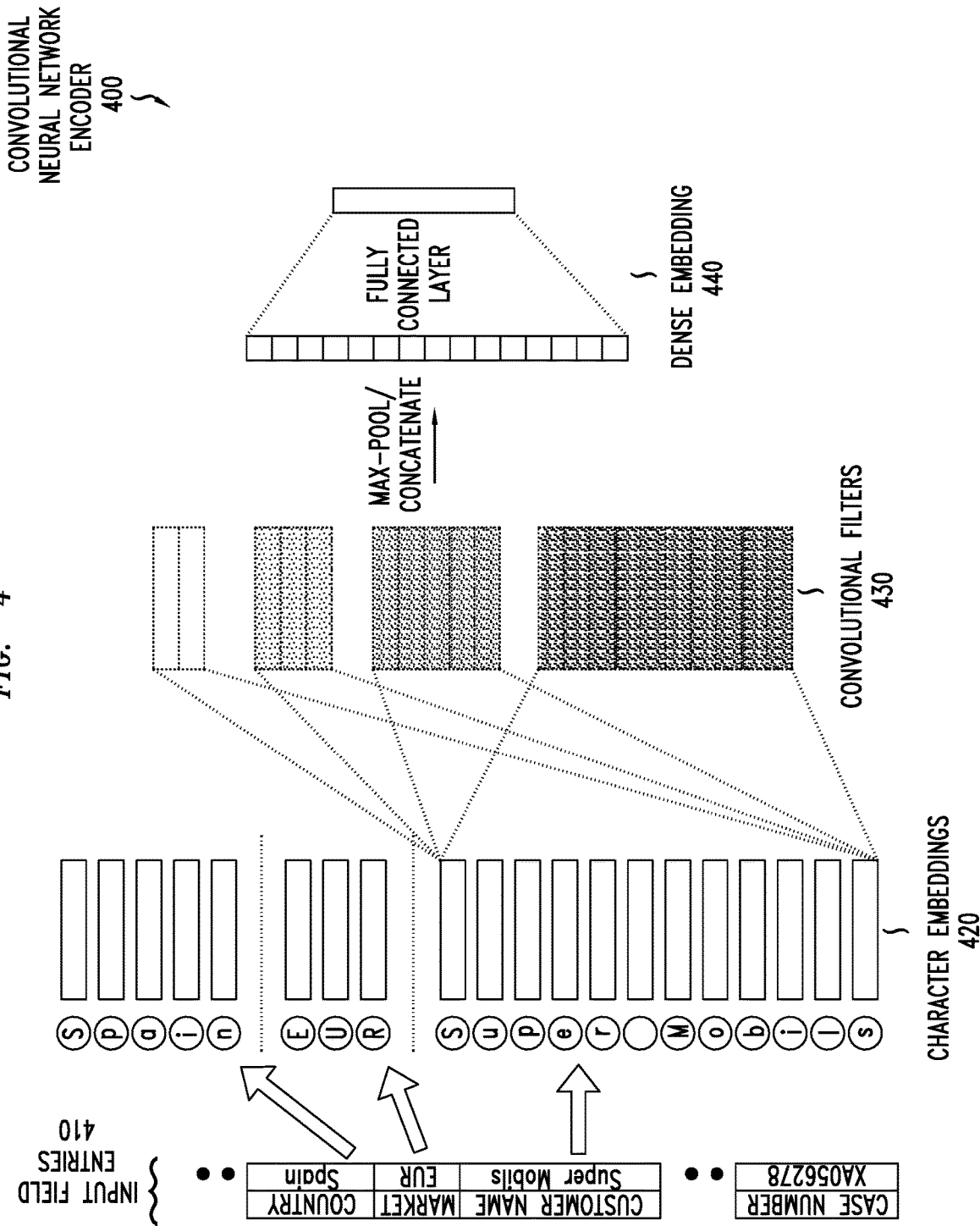
FIG. 4 depicts an example embodiment of a convolutional neural network encoder configured for use in a tabular data processing system to learn a dense embedding based on character embeddings.

FIG. 4 depicts an example embodiment of a convolutional neural network encoder configured for use in a tabular data processing system to learn embedding field analysis vector for a field entry based on character embeddings of the field entry.

The convolutional neural network encoder 400 is configured to convert an input field entry into a dense vector representation of the input field entry. It will be appreciated that the input field entry may be a field entry of training tabular data for purposes of training an embedding knowledge base or a field entry of new tabular data for purposes of field type determination.

The convolutional neural network encoder 400 receives a set of input field entries 410 and is configured to process each of the input field entries 410 to convert the input field entries 410 into dense vector representations of the input field entries 410, respectively. In the example of FIG. 4, four input field entries 410 are depicted (namely, XA056278 in the CASE NUMBER field type, Super Mobils in the CUSTOMER NAME field type, EUR in the MARKET field type, and Spain in the COUNTRY field type); however, for purposes of clarity, processing of only one of the input field entries 410 (namely, Super Mobils in the CUSTOMER NAME field type) for conversion into a dense vector representation of the input field entry 410 is presented in FIG. 4. It will be appreciated that the processing of the other input field entries 410 may be performed in order to convert those other input field entries 410 into dense vector representations of those other input field entries 410.

The convolutional neural network encoder 400 determines character embeddings 420 for the input field entries 410. The convolutional neural network encoder 400 determines, for each of the input field entries 410, character embeddings 420, respectively. In the example of FIG. 4, character embeddings 420 for three of the input field entries 410 are depicted (namely, for Super Mobils in the CUSTOMER NAME field type, EUR in the MARKET field type, and Spain in the COUNTRY field type); however, for purposes of clarity, processing of only one of input field entries 410 (again, Super Mobils in the CUSTOMER NAME field type) is presented in FIG. 4. It will be appreciated, again, that the processing of the other input field entries 410 may be performed in order to convert those other input field entries 410 into dense vector representations of those other input field entries 410.

The convolutional neural network encoder 400 applies the character embeddings 420 for an input field entry 410 to a set of convolutional filters 430. The convolutional filters 430 may include maximum sequence length, convolutional filters of varying window size which may be used to capture sub-string patterns of varying length into the character embeddings 420.

The convolutional neural network encoder 400 concatenates the outputs of the convolutional filters 430 to form a concatenated vector and employs a linear layer to map the concatenated vector to produce the dense embedding 440 for the input field entry 410. The outputs of the convolutional filters 430 may be concatenated after using one-dimensional (1D) max-pooling. The linear layer may be a fully-connected linear layer.

The convolutional neural network encoder 400 outputs the dense embedding 440 for the input field entry 410. It will be appreciated that the dense embedding 440 may be used as field entry vector for use in training an embedding knowledge base for use in field type determination (e.g., as a field analysis vector 315 presented with respect to FIG. 3) or may be used as a field entry vector for use in field type determination based on an embedding knowledge base (e.g., as a field entry vector 333 presented with respect to FIG. 3).

Figure 5:
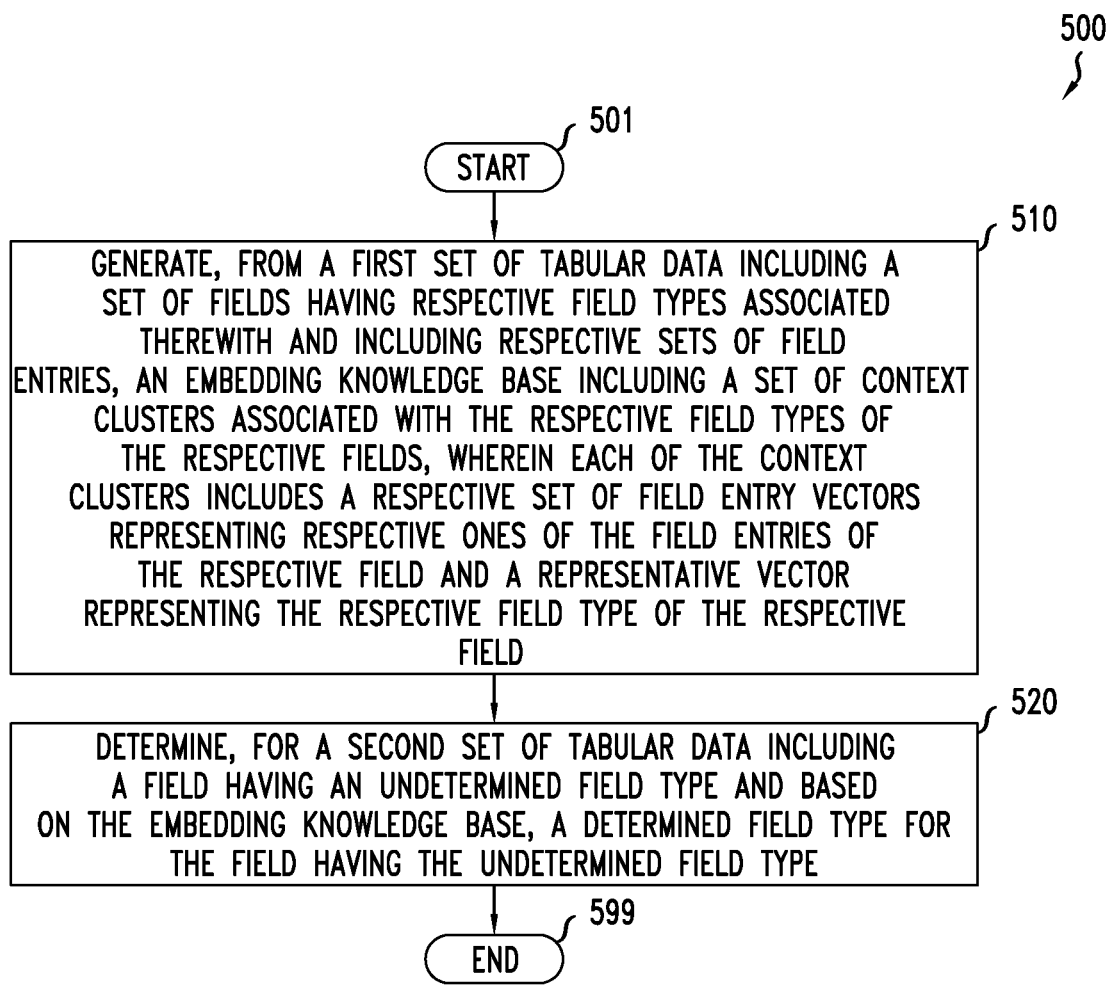
FIG. 5 depicts an example embodiment of a method for processing of tabular data in a manner enabling determination of field types of fields in tabular data.

FIG. 5 depicts an example embodiment of a method for processing of tabular data in a manner enabling determination of field types of fields in tabular data. It will be appreciated that, although primarily presented as being performed serially, at least a portion of the functions of method 500 may be performed contemporaneously or in a different order than as presented with respect to FIG. 5. At block 501, method 500 begins. At block 510, generate, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field. At block 520, determine, for a second set of tabular data including a field having an undetermined field type and based on the embedding knowledge base, a determined field type for the field having the undetermined field type. At block 599, method 500 ends.

Various example embodiments for supporting determination of field types in tabular data may provide various advantages or potential advantages.

For example, various example embodiments for supporting determination of field types in tabular data may be configured to provide various types of improvements in handling of tabular data. For example, various example embodiments for supporting determination of field types in tabular data may be configured to support determination of field types in an automatic, domain-independent manner without relying on domain experts to manually define patterns or schemas. For example, various example embodiments for supporting determination of field types in tabular data may be configured to support determination of field types in a manner that is robust to errors and biases. For example, various example embodiments for supporting determination of field types in tabular data may be configured to support determination of field types in tabular data for a wide variety of domains and projects with less human-generated error or bias even for a massive volume of data and, thus, may be particularly well-suited for telecommunications environments and other similar environments. For example, various example embodiments for supporting determination of field types in tabular data may be configured to provide various improvements in computer performance in handling of tabular data.

For example, various example embodiments for supporting determination of field types in tabular data may be configured to provide various improvements in computer performance in handling of tabular data. For example, various example embodiments for supporting determination of field types in tabular data may be configured to provide various improvements in computer performance in handling of various types of tabular data in various types of environments. For example, various example embodiments for supporting determination of field types in tabular data may be configured to provide various improvements in computer performance in automatically and rapidly identifying and understanding field types and context in tabular data. Various example embodiments for supporting determination of field types in tabular data may be configured to provide various improvements in computer performance in various other aspects of handling of tabular data.

For example, various example embodiments for supporting determination of field types in tabular data may be configured to provide improvements in handling of various types of tabular data in various types of environments. For example, various example embodiments for supporting determination of field types in tabular data may be configured to provide improvements in handling of tabular data in various telecommunications environments. In the telecommunication field, structured and semi-structured textual data received from customer care tickets, diagnostics, surveys, work logs, machine-generated system logs, etc., are extremely prevalent. Many business units, including customer care, support, operations, quality assurance, etc., receive a multitude of these types of data in the form of tables, in which each column corresponds to a different data field, and each row represents a specific customer, incident, device, time, etc. The business units often are required to understand the context and meaning of each field, analyze the data, and take actions based on the generated insights. These data fields greatly differ in their forms and formats across different business units, and even from project to project, and can commonly number in the hundreds or thousands of distinct cases. In other words, the data fields collected across domains or in time do not necessarily conform to a predefined tabular schema. Due to this great variance in structure of data tables, business units need to deploy human annotators with a complete domain knowledge to annotate of fields of interest for each project engagement. Given the diversity and big volume of this data, this is a very time-consuming and resource-consuming task, often resulting in higher risk of errors and bias. Various example embodiments for supporting determination of field types in tabular data may be configured to handle tabular data of telecommunications environments (e.g., domain-specific jargons and non-standard abbreviations), that may not be able to be handled using word-level representation learning (e.g., since they may have different meanings or even unseen and fragmented forms compared to the terms used in natural language), based on use of character-level embeddings. Various example embodiments for supporting determination of field types in tabular data may reduce or obviate the need for use of such human annotators in order to understand tabular data. Various example embodiments for supporting determination of field types in tabular data may be configured to provide improvements in computer performance in automatically and rapidly understanding and annotating field types and context in tabular data, thereby improving downstream data analytics and operations activities used to generate key insights and knowledge and improve various aspects of the telecommunications environments. It will be appreciated that various example embodiments for supporting determination of field types in tabular data may be configured to provide similar improvements in handling of tabular data in various other types of environments.

For example, various example embodiments for supporting determination of field types in tabular data may be configured to provide improvements in handling of types of tabular data while obviating the need for use of other types of tabular data handling capabilities which may have various problems associated therewith. For example, various example embodiments for supporting determination of field types in tabular data may be configured to provide improvements in handling of types of tabular data without leveraging domain expertise. For example, various example embodiments for supporting determination of field types in tabular data may be configured to provide improvements in handling of types of tabular data using an unsupervised learning process. For example, various example embodiments for supporting determination of field types in tabular data may be configured to provide improvements in handling of types of tabular data without relying on heuristics or manual intervention, such that it is very robust to errors and biases and is also applicable to previously unseen schemas. For example, various example embodiments for supporting determination of field types in tabular data may be configured to provide improvements in handling of types of tabular data without relying on schema matching as, in general, schema matching generally involves use of rule-based pattern models that are manually developed by domain experts and that often account for only a small number of very common patterns found in typical databases and are not applicable to larger volumes of distinct patterns (high-dimensional categorical data) or unseen characters from new input data streams and, further, since schema matching typically does not generalize well across different domains (e.g., particularly for tables containing data fields specific to certain technical areas, like the telecommunications field, that is replete with technical jargon, identifiers, and fragmented terms (e.g., acronyms)).

For example, various example embodiments for supporting determination of field types in tabular data may be configured to provide improvements in handling of types of tabular data by supporting automatic determination of field types of tabular data. In at least some example embodiments, contextually similar alphanumeric textual categorical fields may be determined across tabular data from different domains. In at least some example embodiments, dense vector representations of categorical field values in tabular data are learned such that values that appear under the same field get similar representations in structure. In at least some example embodiments, such learned vector representations, also known as embeddings, are stored in a knowledge base for transfer to the new target domain as new tabular data is received. In at least some example embodiments, conceptually similar fields are determined by comparing target fields against the knowledge base. In at least some example embodiments, field determination and annotation may be performed without the need to leverage domain expertise. In at least some example embodiments, field determination and annotation may be performed using a learning process that is unsupervised, such that the learning process learns representations of field values without domain knowledge and therefore, fields, in an automatic and domain-independent manner. In at least some example embodiments, field determination and annotation may be performed without relying on the use of heuristics or manual intervention, thereby making it robust to errors and biases. In at least some example embodiments, field determination and annotation may be performed on previously unseen schemas. In at least some embodiments, use of representation learning using context enables the knowledge base to handle new table data, without any label or context information and from different domains, by learning vector representations leveraging positive and negative context corresponding to the new entry. In at least some embodiments, use of character embeddings with CNN encoders enables the knowledge base to handle unseen and semi-free form textual entries consisting of a mixture of alphanumeric strings and special characters, fragmented forms (e.g., acronyms), technical jargons (special terms that cannot be processed in general natural language processing knowledge bases or in traditional machine learning frameworks), and so forth. In at least some embodiments, the contents of the embedding knowledge base include a library with context clusters that include all possible entities of columns in the form of low-dimensional vectors and their center points, which can be anchors for future comparisons with new entries for field determination purposes.

It will be appreciated that various example embodiments for supporting determination of field types in tabular data may provide various other advantages or potential advantages.

Figure 6:
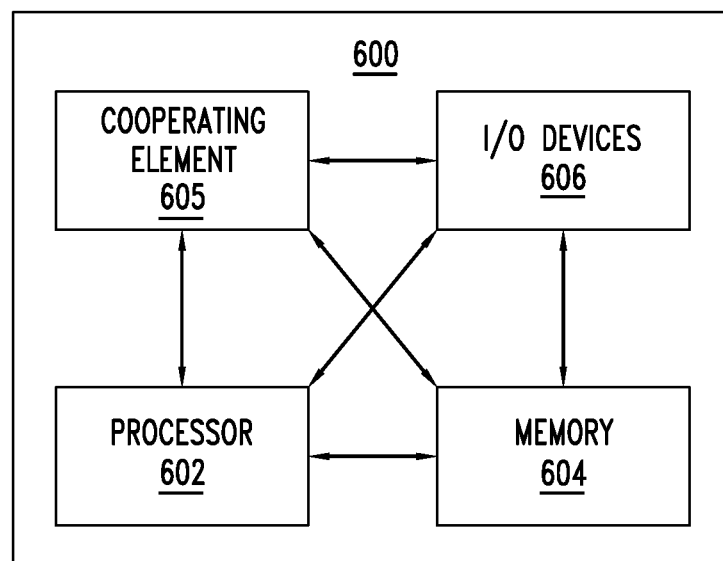
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit, a processor having a set of processor cores, a processor core of a processor, or the like) and a memory 604 (e.g., a random access memory, a read-only memory, or the like). The processor 602 and the memory 604 may be communicatively connected.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 may represent a general architecture and functionality suitable for implementing functional elements described herein, portions of functional elements described herein, or the like, as well as various combinations thereof. For example, computer 600 may provide a general architecture and functionality that is suitable for implementing one or more elements presented herein, such as a tabular data processing system (e.g., tabular data processing system 110, tabular data processing system 200, tabular data processing system 300, or the like), a portion of a tabular data processing system (e.g., one or more elements or combinations of elements), a convolutional neural network encoder (e.g., convolutional neural network encoder 400) or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      generate, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field; and
      determine, for a second set of tabular data including a field having an undetermined field type and based on the embedding knowledge base, a determined field type for the field having the undetermined field type.

2. The apparatus of claim 1, wherein the at least one memory and the computer program code are configured to, with the at least one processor, cause the apparatus to at least:

determine, based on the first set of tabular data, the field entry vectors representing ones of the field entries of the respective field.

3. The apparatus of claim 2, wherein, for at least one of the field entries of the respective field, the respective field entry vector is determined based on log-likelihood processing of a set of field analysis vectors associated with the respective field entry.

4. The apparatus of claim 3, wherein the set of field analysis vectors associated with the respective field entry includes a field entry vector for the field entry, a set of field entry vectors for a set of field entries of the tabular data providing positive context for the respective field entry, and a set of field entry vectors for a set of field entries of the tabular data providing negative context for the respective field entry.

5. The apparatus of claim 4, wherein the set of field entries of the tabular data providing the positive context for the respective field entry includes one or more other field entries of the respective field and the set of field entries of the tabular data providing the negative context for the respective field entry includes one or more other field entries from one or more other fields of the first set of tabular data.

6. The apparatus of claim 4, wherein the log-likelihood processing is configured for at least one of maximizing a likelihood of positive context for the respective field entry or minimizing a likelihood of negative context for the field entry.

7. The apparatus of claim 3, wherein, to determine the respective field entry vector for the respective field entry based on log-likelihood processing of the set of field analysis vectors associated with the respective field entry, the at least one memory and the computer program code are configured to, with the at least one processor, cause the apparatus to at least:
determine, based on the first set of tabular data, one or more positive context field entries for the respective field entry and one or more negative context field entries for the respective field entry;
process, based on a set of convolutional neural network encoders, the respective field entry, the one or more positive context field entries for the respective field entry, and the one or more negative context field entries, to produce a set of field analysis vectors for the respective field entry; and
determine, based on log-likelihood processing of the set of field analysis vectors associated with the respective field entry in a manner tending to maximize positive context and minimize negative context, the respective field entry vector for the respective field entry.

8. The apparatus of claim 3, wherein, for at least one of the field analysis vectors associated with the respective field entry, the field analysis vector is determined based on representation learning based on context.

9. The apparatus of claim 3, wherein, for at least one of the field analysis vectors associated with the respective field entry, the field analysis vector is determined based on application of a mapping configured to map input character embeddings of the respective field entry to a dense embedding representative of the respective field entry.

10. The apparatus of claim 9, wherein the mapping is based on at least one of a convolutional filter, concatenation, max-pooling, or a linear layer mapping.

11. The apparatus of claim 9, wherein the mapping is applied by a convolutional neural network encoder.

12. The apparatus of claim 3, wherein, for at least one of the field analysis vectors associated with the respective field entry, the field analysis vector is determined based on character embeddings.

13. The apparatus of claim 12, wherein, to determine the field analysis vector for the respective field entry based on character embeddings, the at least one memory and the computer program code are configured to, with the at least one processor, cause the apparatus to at least:
provide character embeddings based on a set of characters included in the respective field entry;
apply the character embeddings to a set of convolutional filters with non-linear activation to form a concatenated vector; and
map, based on a linear map, the concatenated vector to provide the field analysis vector in the form of a dense embedding of the respective field entry.

14. The apparatus of claim 1, wherein the at least one memory and the computer program code are configured to, with the at least one processor, cause the apparatus to at least:
determine, based on the field entry vectors representing ones of the field entries of the respective field, the respective representative vector representing the respective field type of the respective field.

15. The apparatus of claim 14, wherein the representative vector representing the respective field type of the respective field is determined based on an element-wise mean of field entry vectors representing ones of the field entries of the respective field.

16. The apparatus of claim 1, to determine the determined field type for the field having the undetermined field type, the at least one memory and the computer program code are configured to, with the at least one processor, cause the apparatus to at least:
determine, based on one or more field entries from the field having the undetermined field type, one or more field entry vectors for the field having the undetermined field type; and
determine, based on comparisons of the one or more field entry vectors for the field having the undetermined field type to at least a portion of the context clusters of the embedding knowledge base, the determined field type for the field having the undetermined field type.

17. The apparatus of claim 16, wherein the comparisons of the one or more field entry vectors for the field having the undetermined field type to at least a portion of the context clusters of the embedding knowledge base are based on use of cosine similarities.

18. The apparatus of claim 16, wherein, based on a determination that multiple potential field types are identified based on the comparisons of the one or more field entry vectors for the field having the undetermined field type to at least a portion of the context clusters of the embedding knowledge base, the determined field type for the field having the undetermined field type is determined based on majority voting.

19. A non-transitory computer-readable medium including instructions configured to cause an apparatus to at least:
generate, from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field; and determine, for a second set of tabular data including a field having an undetermined field type and based on the embedding knowledge base, a determined field type for the field having the undetermined field type.

20. A method, comprising:

generating, by an apparatus from a first set of tabular data including a set of fields having respective field types associated therewith and including respective sets of field entries, an embedding knowledge base including a set of context clusters associated with the respective field types of the respective fields, wherein each of the context clusters includes a respective set of field entry vectors representing respective ones of the field entries of the respective field and a representative vector representing the respective field type of the respective field; and determining, by the apparatus for a second set of tabular data including a field having an undetermined field type and based on the embedding knowledge base, a determined field type for the field having the undetermined field type.

* * * * *